US007257777B1

(12) United States Patent
Kanevsky et al.

(10) Patent No.: US 7,257,777 B1
(45) Date of Patent: Aug. 14, 2007

(54) SYSTEM AND METHOD FOR AUTOMATIC CONTROL OF WINDOW VIEWING

(75) Inventors: Dimitri Kanevsky, Ossining, NY (US); Clifford A. Pickover, Yorktown Heights, NY (US); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 09/619,179

(22) Filed: Jul. 19, 2000

(51) Int. Cl.
*G06F 3/00* (2006.01)
(52) U.S. Cl. .................. 715/794; 715/790; 715/797
(58) Field of Classification Search ................ 345/700, 345/744, 745, 764, 765, 781, 784–788, 789, 345/790, 794, 811, 835; 709/203, 224; 715/763, 715/764, 810, 807
See application file for complete search history.

(56) References Cited

U.S. PATENT DOCUMENTS

| 4,559,533 A | * | 12/1985 | Bass et al. | 345/790 |
|---|---|---|---|---|
| 4,783,648 A | * | 11/1988 | Homma et al. | 345/794 |
| 4,819,189 A | * | 4/1989 | Kikuchi et al. | 715/797 |
| 5,353,400 A | * | 10/1994 | Nigawara et al. | 345/771 |
| 5,365,360 A | * | 11/1994 | Torres | 345/802 |
| 5,561,753 A | * | 10/1996 | Coulombe et al. | 715/835 |
| 5,602,597 A | * | 2/1997 | Bertram | 345/158 |
| 5,699,082 A | * | 12/1997 | Marks et al. | 345/157 |
| 5,774,670 A | * | 6/1998 | Montulli | 709/227 |
| 5,825,360 A | * | 10/1998 | Odam et al. | 715/807 |
| 5,838,317 A | * | 11/1998 | Bolnick et al. | 345/764 |
| 5,841,435 A | * | 11/1998 | Dauerer et al. | 715/775 |
| 5,848,396 A | * | 12/1998 | Gerace | 705/10 |
| 5,875,296 A | * | 2/1999 | Shi et al. | 713/202 |
| 5,878,223 A | * | 3/1999 | Becker et al. | 709/223 |

(Continued)

OTHER PUBLICATIONS

Michael Monticino, Web-analysis: stripping away the hype, 1998, IEEE, pp. 130-132.*

(Continued)

*Primary Examiner*—Weilun Lo
*Assistant Examiner*—Truc Trung Chuong
(74) *Attorney, Agent, or Firm*—Ohlandt, Greeley, Ruggiero & Perle, L.L.P.; Daniel P. Morris, Esq.

(57) ABSTRACT

A system and method for automatic ways of prioritizing the presentation of windows on a graphical user interface (GUI) and for prioritizing and accessing information stored in cache that is used by a web browser. The viewing (tiling) priority of windows, the size of windows, and the position of windows on a GUI are automatically determined from the following criteria: the time the window was first opened, the time the window was last opened, the length of time the window was visible on the screen, the percentage visibility of the window, the amount of scrolling the window has undergone, the content of the window, the time of day, the number of window accesses, and/or some mathematical function of these criteria. Additionally, these same criteria are applied to cached information associated with web pages so that more "relevant" cached web pages are automatically stored in cache for longer periods of time before being discarded in a finite sized cache. The cached information is more quickly accessible by hitting a "back-like" button that shows more relevant (i.e. higher priority) information before less relevant information.

15 Claims, 6 Drawing Sheets

U.S. PATENT DOCUMENTS

| | | | |
|---|---|---|---|
| 5,890,172 A * | 3/1999 | Borman et al. | 707/501.1 |
| 5,892,511 A * | 4/1999 | Gelsinger et al. | 345/794 |
| 5,897,635 A * | 4/1999 | Torres et al. | 707/10 |
| 5,907,836 A * | 5/1999 | Sumita et al. | 707/2 |
| 5,918,014 A * | 6/1999 | Robinson | 709/219 |
| 5,920,316 A * | 7/1999 | Oran et al. | 345/779 |
| 5,956,039 A * | 9/1999 | Woods et al. | 345/419 |
| 6,043,817 A * | 3/2000 | Bolnick et al. | 345/788 |
| 6,067,098 A * | 5/2000 | Dye | 345/531 |
| 6,134,592 A * | 10/2000 | Montulli | 709/229 |
| 6,344,863 B1 * | 2/2002 | Capelli et al. | 715/781 |
| 6,473,088 B1 * | 10/2002 | Matsumoto et al. | 345/530 |
| 6,473,103 B1 * | 10/2002 | Bailey et al. | 345/794 |

OTHER PUBLICATIONS

Cohen et al., Automatic Strategies in the Siemens RTL Tiled Window Manager, 1988, IEEE, pp. 111-119.*

* cited by examiner

SYSTEM AND METHOD FOR AUTOMATIC CONTROL OF WINDOW VIEWING

BACKGROUND OF THE INVENTION

1. Field of the Invention

This invention relates to computer graphical user interfaces. More specifically, the invention relates to a system that automatically alters window viewing priority and window size and that automatically alters cache priority for information presented by web browsers.

2. Description of the Prior Art

Graphical User Interfaces

Graphical user interfaces (GUIs) provide ways for users of computers and other devices to effectively communicate with the computer. GUIs include graphical images on computer monitors and often consist of both icons and windows. GUIs may also reside on the screens of televisions, kiosks, and automatic teller machines (ATMs). A computer window is a portion of the graphical image that appears on the monitor and is dedicated to some specific purpose. Windows allow the user to treat the graphical images on the computer monitor like a desktop where various files can remain open simultaneously. The user can control the size, shape, and position of the windows.

Although the use of GUIs with windows usually simplifies a user's interactions with a computer, GUIs are often tedious and frustrating to use. Windows must be maintained in a logical manner. Often times, windows obscure one another and are difficult to locate. One convenient way to think of windows is as tiles that overlay one another. Windows that have a higher viewing priority are towards the "front" of the viewing area while windows having a lower viewing priority are more obscured (by the "front" windows) and displayed towards the back of the viewing area.

It is difficult to organize windows and icons when many are similarly displayed at the same time on a single device. A need arises for a system and method of automatically controlling window tiling priority and window size so that users may more effectively interact with and manage GUIs, and, also, so that users can easily find windows relevant to their needs.

Examples of computers that change the display (i.e., viewing) priorities of windows are discussed in U.S. Pat. No. 4,783,648 issued to Nobuyuki et al. on Nov. 8, 1988. This reference is herein incorporated by reference in its entirety.

Web Page Caches

Computerized information gathering using such entities as the World Wide Web ("Web") is based around the concept of "pages" of information. A page of information consists of any number of textual, graphical, audio/visual, or other elements (i.e., multimedia information) that are sent upon receipt of a request for that particular page by a computer or other device connected to the network from a server computer that may serve as a host repository for many such pages.

The Web is an extremely widespread information service that can deliver both text and non-text multimedia information (e.g., audio, video and graphics). The Web is a global hypertext system. Hypertext is a computer-based protocol for linking documents to other related documents. Links are embedded within the text of a document in the form of highlighted words or images and, when activated, cause the linked document to be retrieved and displayed. The linked document can itself contain links to other documents, and so on, ad infinitum. Links are most commonly activated by pointing and clicking with a mouse.

A computer system may be attached to an information network, such as the Web, by means of a modem or other network connecting device. Often the user is connected not directly to the information network itself but to an interim computer (network provider) with a direct connection.

The user of the requesting computer may request a specific page by sending a specific page name (such as the Universal Resource Locator, or URL, on the Web) to the network. This name is interpreted and routed to the correct server, which places the requested page data on the network for retrieval by the requesting computer. As mentioned, a page of information may contain "links" (textual or graphical pointers to other pages of information) that are available to the user of the requesting computer. If the user selects one of these links, the name of the associated information page is then requested and the process continues as described above. In this way, the user of the requesting computer can navigate the information network, requesting pages as desired.

While browsing the Web, pages are often stored in cache as a temporary local copy, for example, in a region of local disk storage, so that subsequent browsing to the same information is quicker. For example, a user may use a web browser to visit a web page showing images of cars, and then browse to a web page showing images of tires. By selecting a "back" button on the browser's GUI, the user again browses the page of information containing cars. However, this page, along with the car images, was stored locally on the user's computer when it was first viewed. Thus, this second visit to the car web site need only access the locally stored images. Therefore, the time required to browse the page a second time is shorter than the initial browsing to the page. Because the local storage (cache) available for storing web page information is limited, the portions of the web page cache are often cleared (i.e., deleted) to make room for new information.

A need arises to have a web browser or operating system with a cache prioritizing system so that higher priority information (corresponding to information that is likely to be relevant to a user's needs) is automatically stored in cache for longer periods of time before being discarded than lower-priority information that is not important or relevant. There is also a need to have relevant cached information quickly accessible by hitting a "back-like" button that shows more relevant information before less relevant information.

Examples of computers communicating over a network using web browsers are discussed in U.S. Pat. No. 5,878,223 issued to Becker et al. on Mar. 2, 1999. This reference is herein incorporated by reference in its entirety.

SUMMARY OF THE INVENTION

The present invention is a system and method for automatically prioritizing the presentation of windows on a GUI. The invention automatically determines the viewing (tiling) priority of windows, the size of windows, and the position of windows on a GUI from the following criteria: the time the window was first opened, the time the window was last opened, the length of time the window was visible on the screen, the percentage visibility of the window, the amount of scrolling the window has undergone, the content of the window, the time of day, the number of window accesses, and/or some mathematical function of these criteria.

According to another aspect of the present invention, these same criteria are applied to cached information associated with web pages so that more "relevant" cached web pages are automatically stored in cache for longer periods of time before being discarded in a finite sized cache. The cached information is more quickly accessible by hitting a "back-like" button that shows more relevant (i.e., higher priority) information before less relevant information.

BRIEF DESCRIPTION OF THE DRAWINGS

The invention will be further understood by reference to the following detailed description when read in conjunction with the accompanying drawings, wherein.

DETAILED DESCRIPTION OF THE PREFERRED EMBODIMENTS

Figure 1:
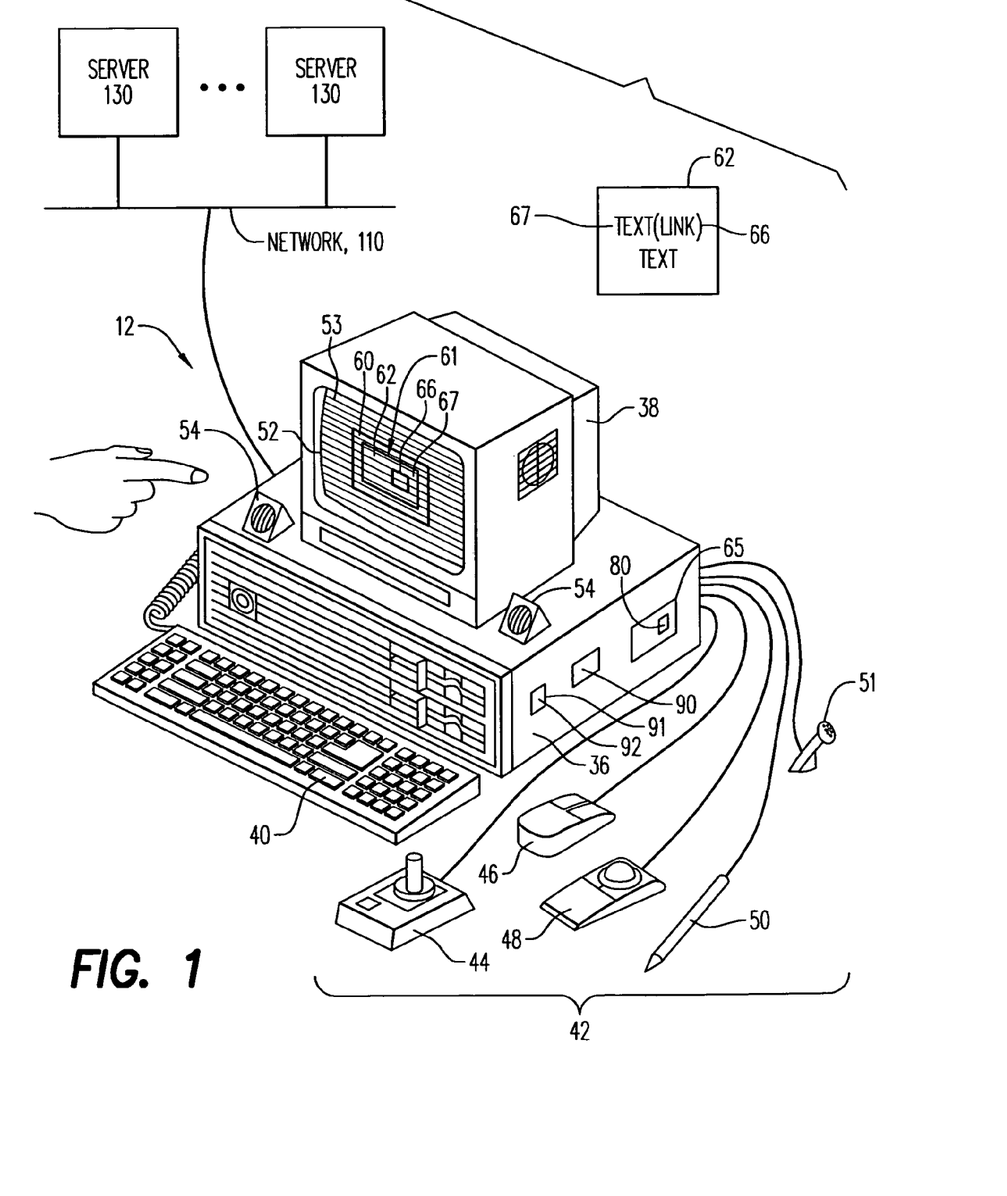
FIG. 1 depicts a pictorial representation of a computer system that embodies the present invention.

Referring to FIG. 1, a computer system 12 includes a computer 36, a computer display 38, a keyboard 40, and multiple input pointing devices 42. Those skilled in the art will appreciate that input pointing devices 42 may be implemented utilizing a pointing stick 44, a mouse 46, a track ball 48, a pen 50, a display screen 52 (e.g., a touch display screen), or any other device that permits a user to manipulate objects, icons, and other display items in a graphical manner on computer display 38.

Connected to computer system 12 may also be audio speakers 54 and/or audio input devices 51. (See, for example, IBM's VoiceType Dictation system. "VoiceType" is a trademark of the IBM Corporation.) GUI 53 may be displayed on screen 52 and manipulated using any input pointing device 42. GUI 53 may include display of an application 60 that displays information pages 62 using any known browser 90. The display of application 60 may be controlled by user-selectable buttons, such as, a smart button 61 that may skip either forward or backward, as described herein. (For, example, traditional back buttons allow previously presented material on a web browser to be redisplayed in reverse order that the pages were browsed.)

The information pages may include graphical, audio, or text information 67 presented to the user via display screen 52, speakers 54, or other output device. The information pages may contain selectable links 66 to other information pages 62, where such links can be activated by one of the input devices 42 to request the associated information pages. This hardware is well known in the art and is also used in conjunction with televisions ("web TV") and multimedia entertainment centers. Computer system 12 contains one or more memories 65 on which the invention reserves space (cache) 80 where a server 130, connected to the computer system 12 through a network 110, can send pages of multimedia information. Network 110 can be any known-local area network (LAN) or wide area network (WAN), e.g., the internet.

Figure 1A:
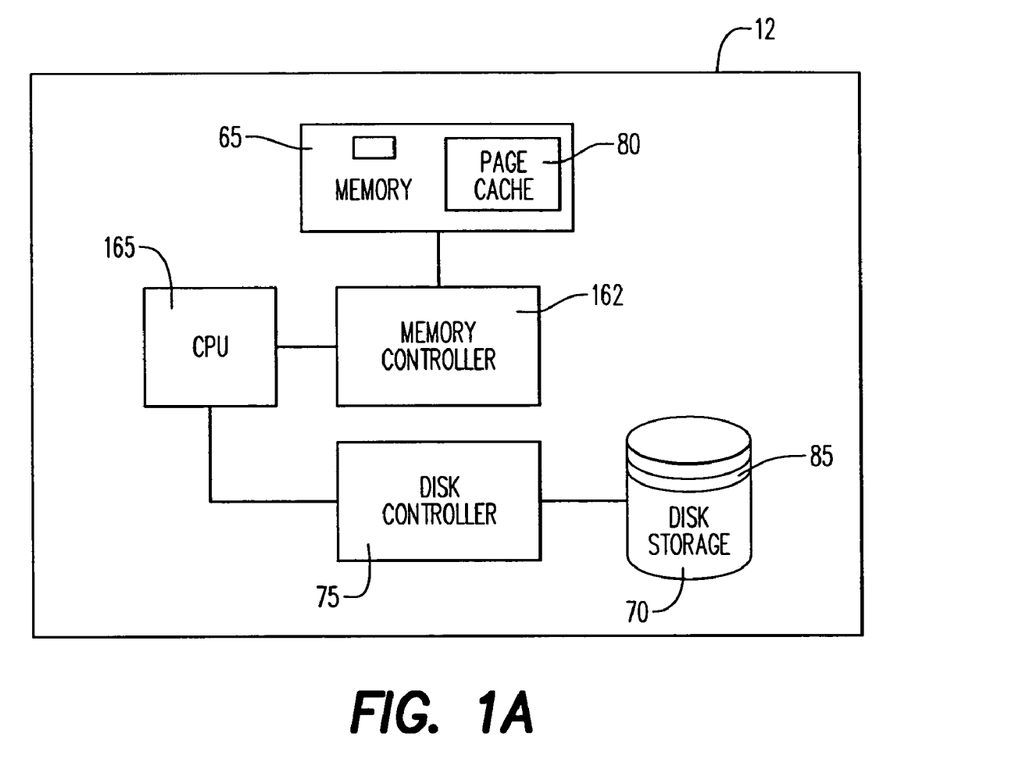
FIG. 1A is a block diagram of the computer system architecture showing a page cache.

Referring to FIG. 1A, computer system 12 includes a Central Processing Unit ("CPU") 165, a memory controller 162, a system memory 65, a disk storage 70, and a disk storage controller 75. A portion of system memory 65 is set aside for information page cache 80. Additionally, file space 85 on disk storage unit 70 may be set aside as an additional information page cache. Generally speaking, a cache is a place where data (e.g., files, images, and other information) can be stored to avoid having to read the data from a slower device, such as a remote, network-attached computer disk. For instance, a disk cache can store information that can be read without accessing remote disk storage.

Figure 2:
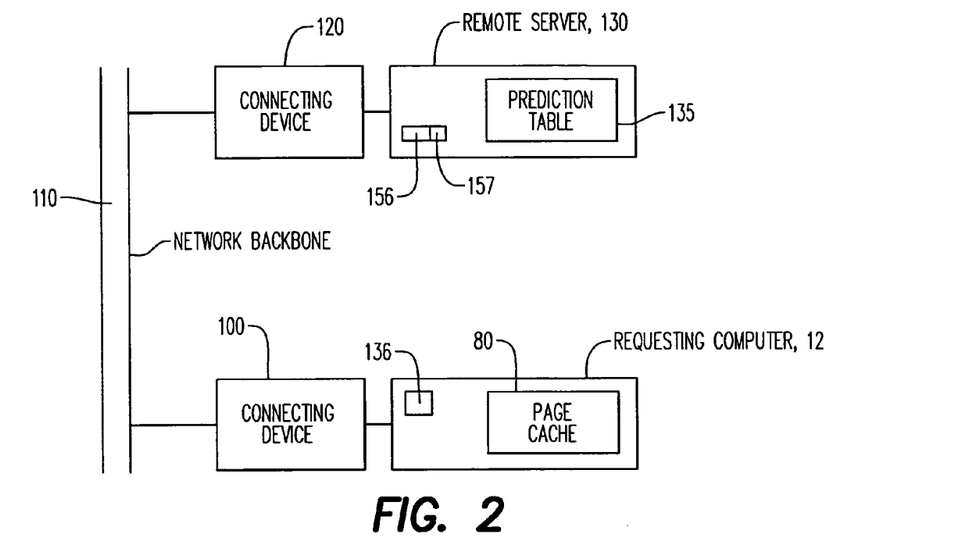
FIGS. 2 and 3 are block diagrams showing portions of a computer network wherein a requesting computer and a server computer are both connected directly to the network.

Referring to FIG. 2, computer system 12 connects to a network backbone 110 by means of a connecting device 100. Also connected to network 110 are one or more server computers 130 by means of their own connecting device 120. Those skilled in the art will appreciate that connecting devices 100 and 120 may take various forms, including modems, token-ring hubs, and other network-enabling devices depending on the capabilities and technology of the connecting devices. Server computer 130 includes an area of system memory and/or disk storage space dedicated to storing and maintaining a history-of-use prediction table 135 (i.e., a data file) which is maintained by tracking the user's use of the computer system. A history of use table 136 may also be maintained in computer system 12.

Figure 3:
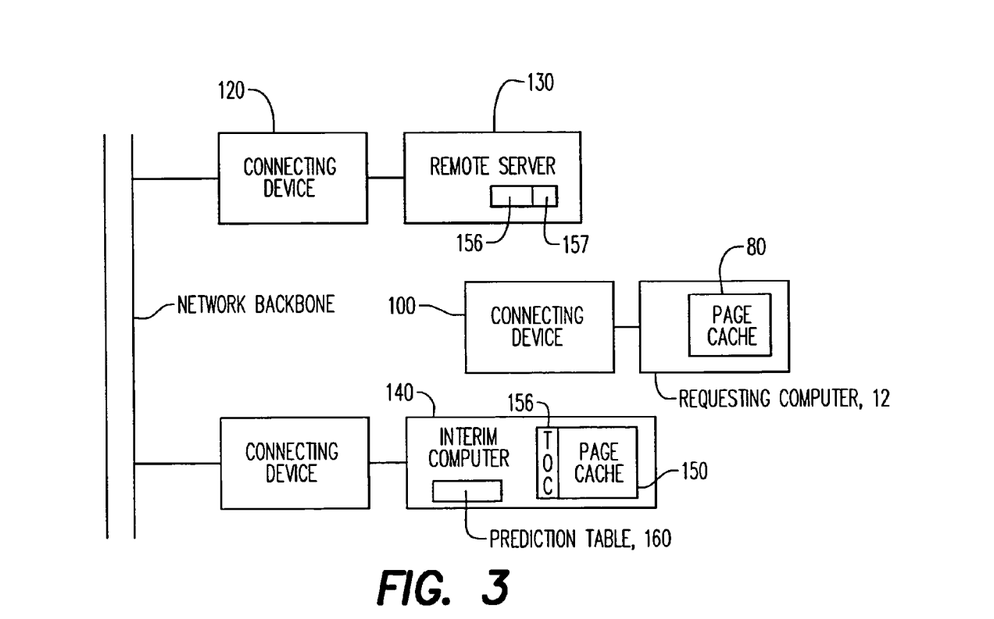

Referring to FIG. 3, computer system 12 is connected via connecting device 100 to an interim computer system 140 (typically owned by a service provider) which in turn is connected to network backbone 110. Interim computer system 140 may contain a section of memory and/or disk space dedicated to keeping a cache 150 of pages obtained from remote servers 130, and a table of contents 156 for cache 150. Table of contents 156 may simply consist of a listing of all the names, or other identifiers, of pages stored in cache 150 to facilitate determining whether the page requested is present in the interim system page cache 150.

Additionally, interim computer system 140 includes an area of system memory and/or disk storage space dedicated to storing and maintaining a history-of-use prediction table 160 as described below. One skilled in the art will recognize interim computer system 140 as typically belonging to an Internet Service Provider, allowing the computer system 12 indirect access to the network backbone 110. An Internet Service Provider is often a company that offers remote computer users access to various remote network information, e.g., files, software, services database access, travel planning, web pages, and news. Web pages are usually addressed and found using an alphanumeric name called a Universal Resource Locator (URL) 157. For example, http:// www.ibm.com is the URL for IBM's web page.

Figure 4:
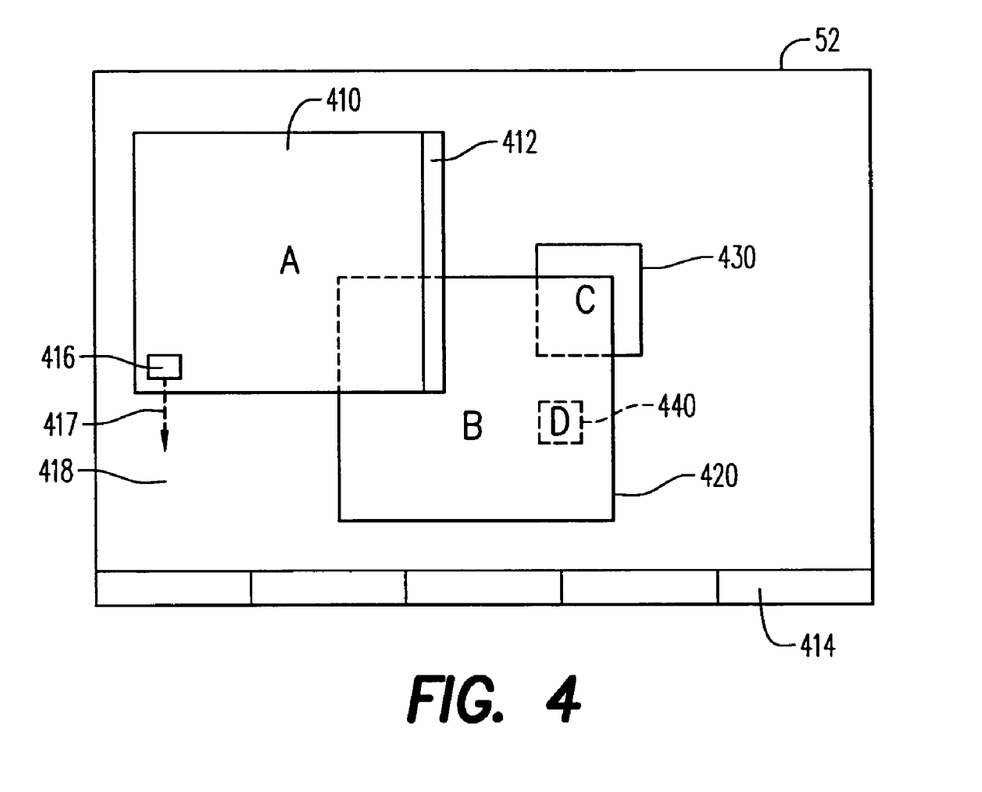
FIG. 4 is a block diagram showing windows on a computer screen.

Referring to FIG. 4, computer display 52 is depicted with windows A 410, B 420, C 430, and D 440. Because all of window A 410 is displayed unoccluded by other windows, it has the highest viewing or tiling priority in this example. Thus, window A 410 is in the "foreground." Window B 420 has the next highest priority, followed by window C 430 and window D 440. Window D 440 is totally obscured by window B 420. The windows often have scroll bars as in the scroll bar 412 for window A 410. Notice that these windows also have different sizes. A task bar 414 is shown at the bottom of the display. The task bar usually contains small icons corresponding to available windows.

Figure 5:
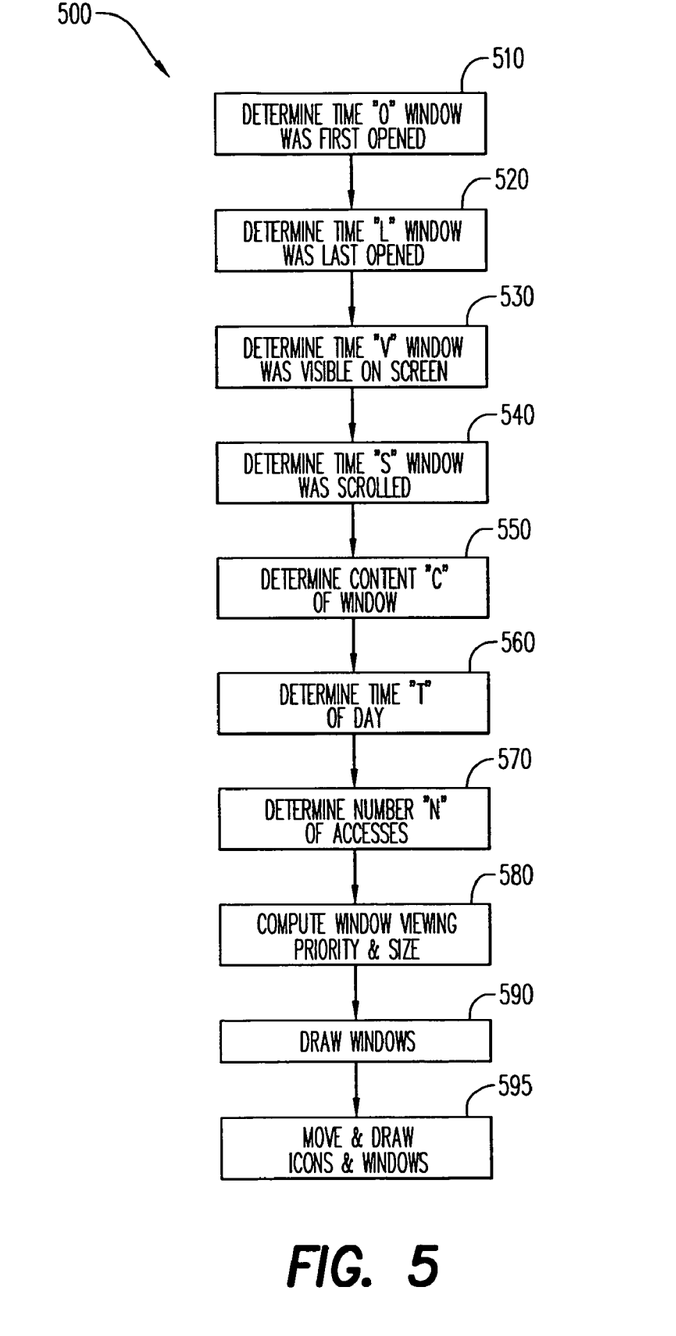
FIG. 5 is a flow chart depicting the steps performed for determining viewing priority, size, and position of windows or other objects displayed on the GUI, as presented on the system shown in FIG. 1.

Referring to FIG. 5, a window viewing priority controller process 500 begins with step 510, in which computer system 12 determines the time "0" the window was first opened; i.e., created. In step 520, computer system 12 determines the time "L" that the window was last opened. The phrase "last opened" may refer to the time the window was restored to a viewable window from an iconified state or brought to the foreground of screen 52 as in window A 410 in FIG. 4. For example, in the Windows operating system, windows are often iconified and represented by little symbols on a task bar. The user may click on the little symbols to bring the window to the foreground. Windows can also be brought to the foreground by clicking on their title bar at the top of the window.

In step 530, computer system 12 determines the time "V" the window was visible on the screen, and to what "degree" (D) the window was open on the screen. "Degree" refers to the percentage of the window that is visible. For example, window C 430 may have been visible for four hours (V=4) and during that time it was, on average, 20% visible (D=0.2) because it was obscured by other windows that partially covered it. The percentage visibility is determined using geometrical methods known to those skilled in the art.

In step 540, the amount of time "S" a window was scrolled is determined. For example, in the Windows operating system, scrolling can be accomplished by dragging an arrow in a scrollbar usually located on the right side of the window. Windows can also be scrolled using keyboard buttons. For example, window A 410 may have been scrolled for 10 seconds even though it may have been visible on the screen for many hours. Scrolling gives an idea of the "importance" or relevance of the information displayed in a window. Information that is frequently scrolled is probably more important than information that is merely visible in the window but never scrolled, unless the information fits on one page and therefore does not need to be scrolled.

In step 550, the content "C" of the window is determined. "Content" refers to the topic of the information in the window. Such content may be determined from the title bar of the window, the words in a document, or by other means. For example, if the title text of the window is "Cars in Europe" and the word "car" occurs several times in the window, a likely content of the window is "cars."

In step 560, the time "T" of day is determined. This is easily obtained using known methods on standard operating systems. Step 570 determines the number "N" of accesses. The number N of accesses is the number of times the windows is brought to the foreground from some position not in the foreground. N may be stored as a time dependent array so that the number of accesses through time is stored. For example, a window might be accessed 10 times on one day, five times on another, and two times on a third day, so N(1)=10, N(2)=5, and N(3)=2.

In step 580, the system computes the window viewing priority as defined in the description for FIG. 4. "Viewing priority" corresponds to the order in which windows occlude other windows. The viewing priority may be computed based on any of the variables mentioned in steps 510 through 570 or on mathematical expressions combining these variables. For example, window A 410 is very relevant because it has been accessed 10 times in the last day (N=10 in step 560). Therefore, in step 590, computer system 12 automatically draws window A 410 above window B 420, which has only been accessed once. Window C 430 is automatically drawn behind windows A 410 and B 420 because window C 430 has not been accessed for five days.

Viewing priority may also affect the size of the window. For example, window A 410 is very relevant because it has been accessed 10 times in the last day (N=10 in step 570). Therefore, in step 590, window A 410 is drawn in front of and larger than window B 420 because window B 420 has only been accessed once in is less likely to be relevant to a user's needs. Window C 430 is automatically smaller than windows A 410 and B 420 because window C 430 has not been accessed for five days. Computer system 12 may reshuffle the viewing priority and redraw the windows in step 590 automatically or only when a redrawing function is selected by the user. Optionally, the "current" foreground window will not be shuffled to the background without the user making a choice so that current work is not disturbed.

Computer system 12 monitors a user's history of use to acquire information such as the time various windows were first opened (step 510) and the number of times the windows have been accessed (step 570). This information may be stored in a database or history-of-use table 135, 160, 136 such that each window has an identifier that is associated with history-of-use information. The history of use includes the aforementioned variables as V, T, S, O, L, and D. The database may also include such information such as the content of the window. This content may be stored as keywords, such as "cars", "computer", "finance," etc.

A mathematical relationship may specify a relative importance "R" between the time the window was first opened (O) or last opened (L), the number (N) of times the window has been accessed for a time period, etc. All the other variables may enter into a mathematical relationship. Relative importance R controls the viewing priority. For example, consider that window A 410 was last opened one minute ago (L=1) and has been accessed 10 (N=10) times in the past day. Consider that window B 420 was last opened 1000 minutes (L=1000) ago and has been accessed 20 times (N=20). A function, such as $$R=N/L,$$

might determine relative importance R. In the above example, window A 410 that was accessed 1 minute ago (L=1) has a higher R value than window B 420 that was accessed 1000 minutes ago (L=1000). The more times a window is accessed, the more relevant the window becomes to a user's needs. Increased relevance corresponds to higher viewing priority, window size, special color, and window position on GUI 53.

The "content" of a window may also influence the window's automatic viewing priority, color, position, and size. For example, if computer system 12 determines that "fractals"are very relevant to the user's needs because windows with content relating to fractals have been often scrolled (step 540) in the past 10 days, windows with content relating to fractals will have automatic higher tiling priority.

Content may be determined in numerous ways known to those skilled in the art. For example, computer system 12 may scan the window contents for keywords. Keywords that occur frequently give an indication of a document's content. If a document displayed in a window has a title or major headings, words in the title and major headings are likely to give information as to the windows content. Other techniques, such as latent semantic indexing, may also be used to determine the content of a window. If useful, the user may manually assign a content label to a window that specifies the window content.

Although windows have so far been used as examples, the invention also applies to other aspects of the GUI. For example, the positions of icons in a task bar 414 may be related to the tiling priority. For instance, task bar icons on the left may have high priority than the rights and process 500 may control this positioning. (In this case, step 590 controls the position of icons in the task bar.) Similarly, the arrangement of windows or icons on the desktop may have a tiling priority or position dependent on the calculated tiling priority. For instance, higher priority icons or windows may be positioned on the top of screen 52 or in regions likely to be seen by a user. For example with reference to FIGS. 4 and 5, in step 595, a desktop icon 416 with high priority automatically moves as shown by arrow 417 to a region 418 of the desktop that is not occluded by a window so that icon 416 may be easily seen. A desktop icon with a low priority automatically moves to a region of the desktop that is occluded by other windows. This movement may also apply to windows.

Windows with lower priority, based on the aforementioned, criteria, may automatically minimize or change graphical attributes (e.g., color, intensity, etc.). This change of graphical characteristics is accomplished in step 590.

A thumb-nail index, taskbar, menu list, or other indicator of priorities of all windows and/or icons may assist the user in visualizing priorities.

The time of day determined in step 560 may influence the window priority, as would a history of the user's use of windows as a function of time of day. For example, computer system 12 may bring the windows corresponding to the e-mail system to higher priority in the morning and place a window corresponding to stock market prices at lower priority. This relative priority may be reversed in the late afternoon.

The present invention can be applied to cached web pages so that more "relevant" cached web pages are automatically stored in cache for longer periods of time before being discarded in a finite sized cache, or cached information is more quickly accessible by hitting a "back-like" button that shows more relevant information before less relevant information. Cache relevance is determined by many of the aforementioned criteria.

Figure 6:
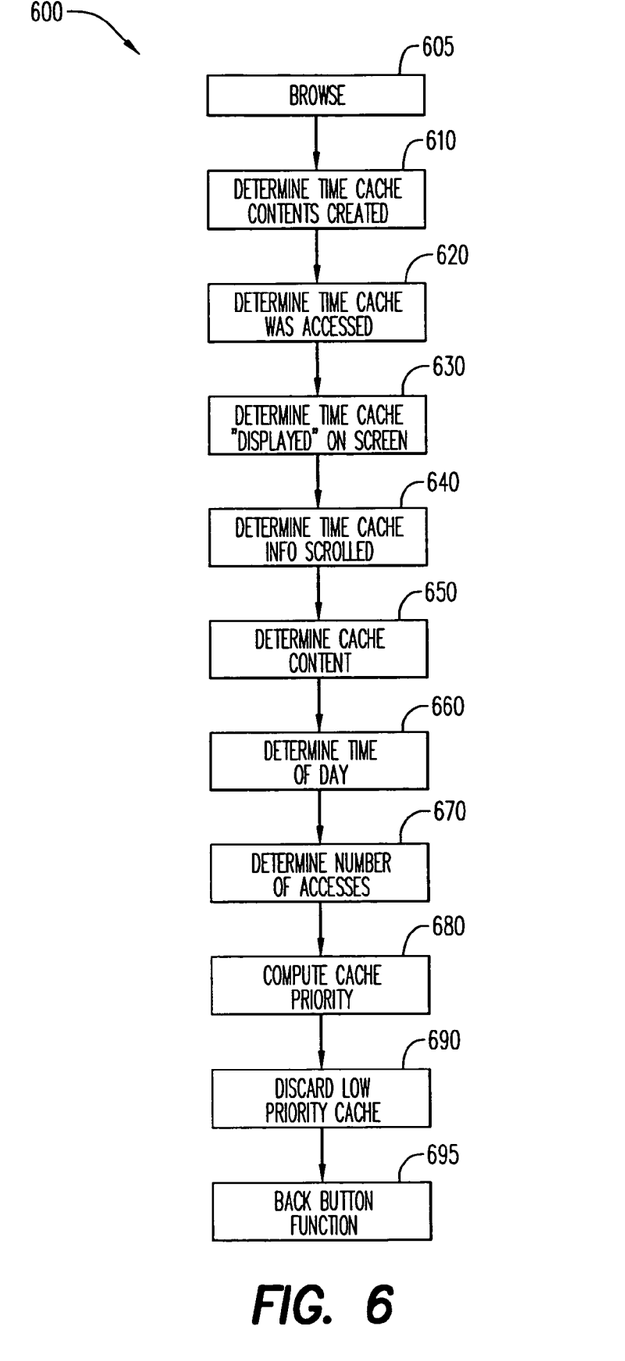
FIG. 6 is a flow chart depicting the steps performed to determine the cache priority of a web browser's cache as shown in the requesting computer in FIGS. 1 and 1A.

Referring to FIG. 6, a cache priority process 600 is used by local computer system 12 to determine which cache contents have higher priority than others. Note that a requesting computer system 12 may communicate with several different server computers 130 or 140 during the course of a network session. Each time a communication is established with a new server 130, a page sending process is performed. In step 605, process 600 is initiated when the requesting computer system 12 sends a request for a page name to the server. The request is typically a URL that addresses one of the pages on server 130 or 140. In step 605, server 130 or 140 begins sending the selected page to the requesting computer system 12. While the page is being received, it is also cached on the requesting computer system 12 or other computers. Cached information includes images, digitized sounds, text, and animations.

In step 610, computer system 12 determines the time "O" that the cache contents for web page information was first written, i.e., created. In step 620, computer system 12; determines the time L that the window was last accessed, corresponding to the time when the cached information was last displayed on a web browser.

In step 630, computer system 12 determines the time "V" that the cached information was displayed on the screen by a web browser, and to what degree D the web browser window was visible on the screen. For example, a web browser window may have been visible for four hours (V=4) and during that time it was 20% visible (D=0.2) because it was obscured by other windows that partially covered it. The percentage visibility is determined using geometrical methods known to those skilled in the art.

Step 640 determines the amount of time S a web browser was scrolled for a particular cached page of information. For example, most browsers have a scrollbar, and users can drag an arrow in a scrollbar usually located on the right side of the browser window. Browsers can often be scrolled using keyboard buttons. For example, a browser may have been scrolled for 10 seconds even though it may have been visible on the screen for many hours. Scrolling gives an idea of the importance or relevance of the displayed (or played) cached material. Material that is frequently scrolled is probably more important than information that is merely visible in the browser but never scrolled, unless the information fits on one page and therefore does not need to be scrolled.

Step 650 determines the content C of the cache. "Content" refers to the topic of the information. Such content may be determined from the title of the cached web page, the words in the web page, or by other means. For example, if the title text of the web page is "Planes in France" and the word "plane" occurs several times in the window, a likely content of the cached information is "planes." In step 660, the time T of day is determined. This is easily obtained using known methods on standard operating systems.

Step 670 determines the number N of accesses for a particular web page corresponding to cached information. The number N of accesses is the number of times the cached information has been displayed in the browser window as a web page. The number N may be stored as a time dependent array so that the number of accesses through time is stored. For example, a cached page might be accessed 10 times on one day, 5 times on another, and 2 times on a third day, so N(1)=10, N(2)=5, and N(3)=2.

In step 680, computer system 12 computes the cache priority for cached information. The cache priority may be computed based on any of the variables mentioned in steps 610 through 670 or on mathematical expressions combining these variables. For example, cached page A is very relevant to a user's needs because it has been accessed 10 times in the last day (N=10 in step 660). Cached page B is not relevant to a user's needs because it has been accessed 1 time in the last day (N=1 in step 660). Because the available cache storage on a machine is limited, and cached information is discarded by web browser software from time to time, process 600 of the present invention discards the information corresponding to cached page B before the information corresponding to cached page A. In step 690, lower priority cached web pages are discarded.

Computer system 12 monitors a user's history of use to acquire information, such as the time various cached pages were first written (i.e., stored in cache) (step 610) and the number of times the cached information has been accessed (step 670). This information may be stored in a database or history-of-use table 135, 160, 136 such that each web page has an identifier that is associated with history of use information. The history of use includes the aforementioned variables as V, T, S, O, L, and D. The database may also include information, such as the content of the web page. This content may be stored as keywords, such as, "cars", "computer", "finance," etc.

A mathematical relationship may specify relative importance R between the time the cache was first written (O) or last accessed (L), the number of times (N) the cache has been accessed for a time period, etc. All the other variables may enter into a mathematical analysis. Relative importance R controls the cache priority. For example, consider a cached web page A that was last accessed one minute ago (L=1) and has been accessed 10 (N=10) times in the past day. Consider a cached web page B that was last opened 1000 minutes (L=1000) ago has been accessed 20 times (N=20). A function, such as, $$R=N/L$$

might determine relative importance R so that, for example, a cached page that was accessed 1 minute ago (L=1) has a higher R value than one that was accessed 1000 minutes ago (L=1000). The more times the cached information is accessed, the more likely it is to be more relevant to a user's needs. Increased relevance corresponds to a longer time that the page may stay in cache before being deleted.

The "content" of a cached information may also influence its cache priority. For example, if the system determines that "car parts" are very relevant to the user's needs because windows with content relating to car parts have been often used in the past 10 days, caches with content relating to car parts will have automatic higher cache priority. This means that information of this type will stay in cache longer than information that is not relevant, which may be discarded when there is insufficient storage space available for web pages.

Content may be determined in numerous ways known to those skilled in the art. For example, the system may scan the web page cache (or original web page corresponding to the information in cache) for keywords. Keywords that occur frequently give an indication of a document's content. If a document displayed in a browser has a title or major headings, words in the title and major headings are likely to give information as to the page's content. Other techniques, such as, latent semantic indexing, may also be used to determine the content of a web page. If useful, the user may manually assign a content label to web page information, and this specifies the web page cache content.

As another example, if the system determines that a user is interested in fractals, web pages with content relating to fractals may automatically be stored in cache for longer periods of time so that a user may more quickly again access information pages and images corresponding to fractals. Similarly, if a web page has been accessed many times in the past, its contents may be stored in cache longer.

The present invention may also be applied to other applications such as those that present users with a list of files to open, as commonly provided by text editors, graphics programs, etc. The list of files may be optionally sorted by priority (in steps 590 and 595) according to the aforementioned criteria.

Web browsers generally have skip functions that permit a user to go back to pages previously viewed or to go forward to pages yet to be viewed. For example, a back button allows users to go to previously accessed pages in reverse order that the pages were browsed. Smart back button 61 (FIG. 1) allows the user to go back to, for example, pages that have been accessed frequently, as may be determined in step 670 and accomplished in step 695, because smart back button 61 "cycles" through pages in order of relevance which is determined by time of access, content, and number of accesses, etc. For example, when a user selects smart back button 61, the web browser displays a web page accessed 20 times in the past 5 days. When the user selects smart back button 61 again, the web browser displays a web page accessed 18 times in the past 5 days, and so forth.

Smart back button 61 may be a hardware button, such as on a computer, personal digital assistant, kiosk, set-top box, TV, camera, etc. or, alternatively, a software button on a GUI, such as displayed on a screens on a computer, personal digital assistant, kiosk, set-top box, TV, camera, etc.

The present invention having been thus described with particular reference to the preferred forms thereof, it will be obvious that various changes and modifications may be made therein without departing from the spirit and scope of the present invention as defined in the appended claims.

What is claimed is:

1. A method for automatic control of window overlap, comprising:
   automatically determining priorities of each window of a plurality of overlapping windows displayed on a graphical user interface, wherein said window priority is derived from a topic of each window of said plurality of windows and said topic of said window is determined by a frequency of occurrence of at least one keyword in said window;
   automatically arranging said plurality of windows to overlap one another in order of said priority on said graphical user interface; and
   automatically re-arranging icons that are in a task bar on said graphical user interface and that correspond to said overlapping windows so that said icons are in order of said window priority,
   wherein said priority of said window is assigned based on a priority of said topic, and said priority of said topic is determined based on a number of times a window having said topic is accessed.

2. The method according to claim 1, further comprising:
   automatically sizing said windows on said graphical user interface according to said priority.

3. The method according to claim 1, further comprising:
   automatically positioning said windows on said graphical user interface according to said priority.

4. The method according to claim 1, wherein said windows are automatically re-arranged only when a redrawing function is selected by a user.

5. The method according to claim 1, further comprising:
   automatically displaying for said window in a color according to said priority on said graphical user interface.

6. The method according to claim 1, wherein said content of said window is determined by a content label assigned by a user.

7. The method according to claim 1, further comprising:
   automatically arranging icons so that said icons overlap one another in order of said priority on a desktop on said graphical user interface.

8. A method for automatic control of window overlap based on a user's history of window use, comprising:
   automatically determining a priority of each window of a plurality of overlapping windows displayed on a graphical user interface, wherein said priority is derived from an amount of time during which scrolling is performed on a window, wherein said scrolling includes dragging contents of a window to reveal additional contents;
   automatically arranging said plurality of windows to overlap one another in order of said priority on said graphical user interface; and
   automatically re-arranging icons that are in a task bar on said graphical user interface and that correspond to said overlapping windows so that said icons are in order of said window priority, wherein said priority of said window is assigned based on a priority of said topic, and said priority of said topic is determined based on a number of times a window having said topic is accessed.

9. The method according to claim 8 further comprising storing one or more of said criteria.

10. The method according to claim 8, further comprising: automatically sizing said windows on said graphical user interface according to said priority.

11. The method according to claim 8, further comprising: automatically positioning said windows on said graphical user interface according to said priority.

12. The method according to claim 8, wherein said windows are automatically re-arranged only when a redrawing function is selected by a user.

13. The method according to claim 8, further comprising: automatically displaying said window in a color according to said priority on said graphical user interface.

14. The method according to claim 8, further comprising: automatically arranging icons so that said icons overlap one another in order of said priority on a desktop on said graphical user interface.

15. A method for automatic control of window overlap, comprising:

automatically determining priorities of each window of a plurality of overlapping windows displayed on a graphical user interface;

automatically arranging said plurality of windows to overlap one another in order of said priority on said graphical user interface; and automatically re-arranging icons that are in a task bar on said graphical user interface and that correspond to said overlapping windows so that said icons are in order of said window priority, wherein said window priority is derived from a topic of each window of said plurality of windows, wherein said topic of each window is determined by at least one keyword and said window priority is determined from a topic priority, wherein said topic priority is determined by a number of times a window having said topic is accessed, and wherein said window priority is determined by i) scanning said window for said at least one keyword and determining a frequency of said at least one keyword in said window to determine said topic of said window, and ii) assigning a priority based on said topic priority.

* * * * *